US010212259B2

(12) United States Patent
Narasimhamurthy

(10) Patent No.: US 10,212,259 B2
(45) Date of Patent: Feb. 19, 2019

(54) MANAGEMENT OF TRANSMISSION CONTROL BLOCKS (TCBS) SUPPORTING TCP CONNECTION REQUESTS IN MULTIPROCESSING ENVIRONMENTS

(71) Applicant: Oracle International Corporation, Redwood Shores, CA (US)

(72) Inventor: Giridhar Narasimhamurthy, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1037 days.

(21) Appl. No.: 14/556,274

(22) Filed: Dec. 1, 2014

(65) Prior Publication Data

US 2016/0156747 A1 Jun. 2, 2016

(51) Int. Cl.
*H04L 29/06* (2006.01)
*H04L 29/08* (2006.01)

(52) U.S. Cl.
CPC .......... *H04L 69/163* (2013.01); *H04L 67/141* (2013.01); *H04L 69/03* (2013.01)

(58) Field of Classification Search
CPC ........ H04L 69/16; H04L 69/161; H04L 69/12
See application file for complete search history.

(56) References Cited

U.S. PATENT DOCUMENTS

| 7,191,241 | B2* | 3/2007 | Boucher | H04L 69/16 |
| | | | | 709/230 |
| 7,787,453 | B2 | 8/2010 | Tran et al. | |
| 8,274,976 | B2 | 9/2012 | Aloni et al. | |
| 8,346,999 | B2 | 1/2013 | Dubal et al. | |
| 8,543,729 | B2 | 9/2013 | Pope et al. | |
| 8,635,352 | B2 | 1/2014 | Shemesh | |
| 2004/0054996 | A1* | 3/2004 | Srinivas | H04L 69/16 |
| | | | | 718/1 |
| 2005/0182841 | A1* | 8/2005 | Sharp | H04L 69/16 |
| | | | | 709/228 |
| 2006/0198296 | A1* | 9/2006 | Majee | H04L 1/1671 |
| | | | | 370/216 |

(Continued)

OTHER PUBLICATIONS

Shinae Woo, Kyoungsoo Park, Scalable TCP Session Monitoring with Symmetric Receive-side Scaling, downloaded circa Jul. 3, 2014, pp. 1-7.

*Primary Examiner* — Philip J Chea
*Assistant Examiner* — Mohammed Ahmed
(74) *Attorney, Agent, or Firm* — IPHorizons PLLC; Narendra Reddy Thappeta

(57) ABSTRACT

A source system executing applications in a multiprocessing environment supports transmission control protocol (TCP) connections. In an embodiment, the source system maintains a corresponding list of transmission control blocks (TCBs) for each processing entity. When an application executing on a first processing entity in the source system requests a new TCP connection to a destination system, an open TCP connection request is transmitted to said destination system on a network. A first TCB for the new TCP connection may be formed, indicating that the connection is in the process of being established. The connection may be allocated to a second processing entity, and the first TCB may be migrated as a second TCB, which is included in a list of TCBs associated with the second processing entity.

20 Claims, 9 Drawing Sheets

(56) References Cited

U.S. PATENT DOCUMENTS

| | | | |
|---|---|---|---|
| 2009/0006521 A1 | 1/2009 | Veal et al. | |
| 2010/0077063 A1* | 3/2010 | Amit | H04L 12/12 709/221 |
| 2010/0332212 A1* | 12/2010 | Finkelman | G06F 1/3203 703/23 |
| 2011/0023042 A1 | 1/2011 | Pope et al. | |
| 2012/0131203 A1* | 5/2012 | Pyatkovskiy | H04L 12/413 709/227 |
| 2014/0226665 A1* | 8/2014 | Ido | H04L 45/745 370/392 |

* cited by examiner

MANAGEMENT OF TRANSMISSION CONTROL BLOCKS (TCBS) SUPPORTING TCP CONNECTION REQUESTS IN MULTIPROCESSING ENVIRONMENTS

BACKGROUND OF THE DISCLOSURE

Technical Field

The present disclosure relates to machines implementing Transmission Control Protocol (TCP), and more specifically to management of transmission control blocks (TCBs) supporting TCP connection requests in multiprocessing environments.

Related Art

Transmission Control Protocol (TCP) provides reliable transport for a sequence of bits/bytes (data), even if such sequence is sent in the form of multiple data packets. Reliable delivery of the sequence is ensured by using appropriate acknowledgments and retransmission requests, as is well known in the relevant arts. TCP commonly operates on top of IP (Internet Protocol), which defines an addressing mechanism and forwarding mechanism such that each data packet can be delivered to a desired end network node (or nodes).

A connection is the basis for transporting data from a source application executing on a source node to a destination application in a destination node. The source and destination applications may thus be viewed as containing the end points of each connection. Each TCP/IP packet contains a source IP address and a source port number, which uniquely identifies the end point as the source application. The packet similarly contains a destination IP address and a destination port number, which uniquely identifies the end point as the destination application. The quartet of the IP addresses and port numbers uniquely identifies each connection.

Transmission Control Blocks (TCB) are data structures maintained in each network node corresponding to TCP connections. The TCBs may store information to identify the end points of the connection (e.g., identifier of a socket created by the application as the entry/egress point of the connection in some Unix type environments), the state of the connection (e.g., whether establishment of connection is complete or ongoing or being terminated, etc.,), identification of the buffer area where the data for the connection is stored as the data packets are received or transmitted, etc.

Multi-processing environments often contain applications which initiate TCP connection requests. Initiation of a TCP connection request implies causing sending of a corresponding data packet as a part of a negotiation to establish the connection with the destination application. Specific challenges may be presented in view of multiple concurrent processing entities, potentially implemented by independent processors, when such TCBs are employed to support TCP connection requests. Aspects of the present disclosure address some of the related challenges, as described below with examples.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

A source system executing applications in a multiprocessing environment supports transmission control protocol (TCP) connections according to an aspect of the present disclosure. In an embodiment, the source system maintains a corresponding list of transmission control blocks (TCBs) for each processing entity. When an application executing on a first processing entity in the source system requests a new TCP connection to a destination system, an open TCP connection request is transmitted to said destination system on a network. A first TCB for the new TCP connection may be formed, indicating that the connection is in the process of being established. This TCB may be added to a list of TCBs whose connections are not fully established.

The connection may be allocated to a second processing entity (for example, by a network interface card) and the establishment of the TCP may be completed by the operation of the second processing entity. A second TCB may be included in a list of TCBs associated with the second processing entity, with the second TCB indicating that the TCP connection is established to the destination system for said application. TCP segments received on the new TCP connection are thereafter delivered to the second processing entity in view of the second TCB.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
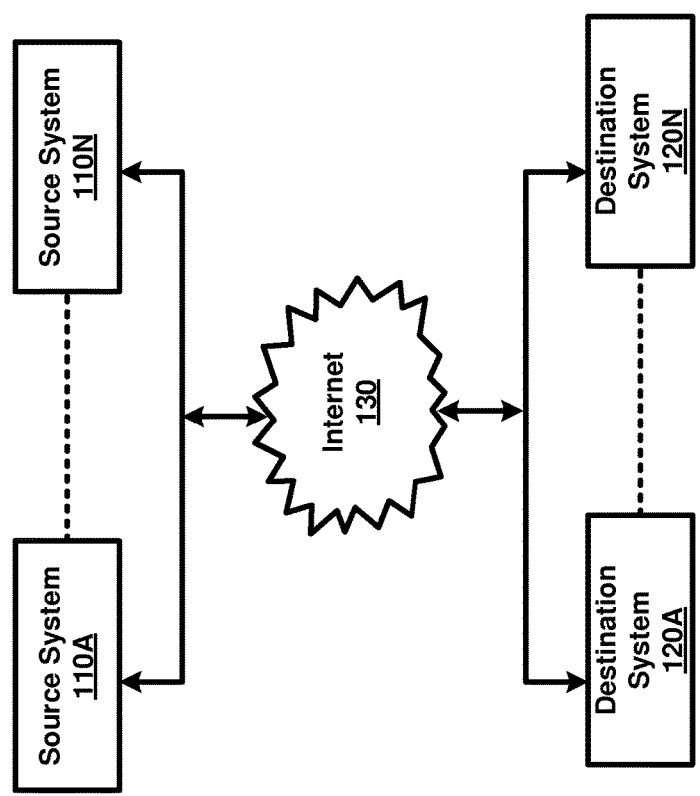
FIG. 1 is a block diagram illustrating an example environment (computing system) in which several aspects of the present disclosure can be implemented.

FIG. 1 is a block diagram illustrating an example environment in which several aspects of the present disclosure can be implemented. The block diagram is shown containing source systems 110A-110N, Internet 130, and destination systems 120A-120N.

Merely for illustration, only representative number/type of systems is shown in FIG. 1. Many environments often contain many more systems, both in number and type, depending on the purpose for which the environment is designed. Each block of FIG. 1 is described below in further detail.

Internet 130 may be implemented using protocols such as Internet Protocol (IP), well known in the relevant arts. Internet 130 transports IP packets between source systems 110A-110N and destination systems 120A-120N, which form the basis for establishment of TCP connections and forwarding of data/IP packets.

Each of destination systems 120A-120N represent a system such as a server (e.g., web server, file server, etc.,), executing applications which can be accessed from remote systems. Each destination system may be designed to accept TCP connection requests from source systems 110A-110N, and exchange data in the form of TCP/IP packets over Internet 130. The packets thus exchanged are used by applications at the source and/or destination systems for implementing the corresponding applications.

Each of source systems 110A-110N represents a system which interacts with destination systems 120A-120N using TCP connections noted above. Each source system is assumed to be implemented using a multi-processing environment, in which multiple processing entities operate in parallel concurrently. For example, each processing entity may correspond to a corresponding processor/core of a multi-core processor or a processor thread/hyper-thread of a multi-threaded processor.

Each processing entity may establish corresponding set of TCP connections with desired set of destination systems. At least for some of such TCP connections, the processing entities may send TCP connection requests to initiate setting up of corresponding TCP connections. Any system where the TCP connection request originates may be designated as a source system and any system to which the TCP connection request is made to may be designated as a destination system. While each system of FIG. 1 is shown operating as a source or destination system merely for ease of description, it should be appreciated that many systems often operate as both source and destination systems.

Aspects of the present disclosure facilitate management of transmission control blocks (TCBs) in support of TCP connection requests from source systems, as described below with examples.

3. Management of TCP Connection Requests

Figure 2:
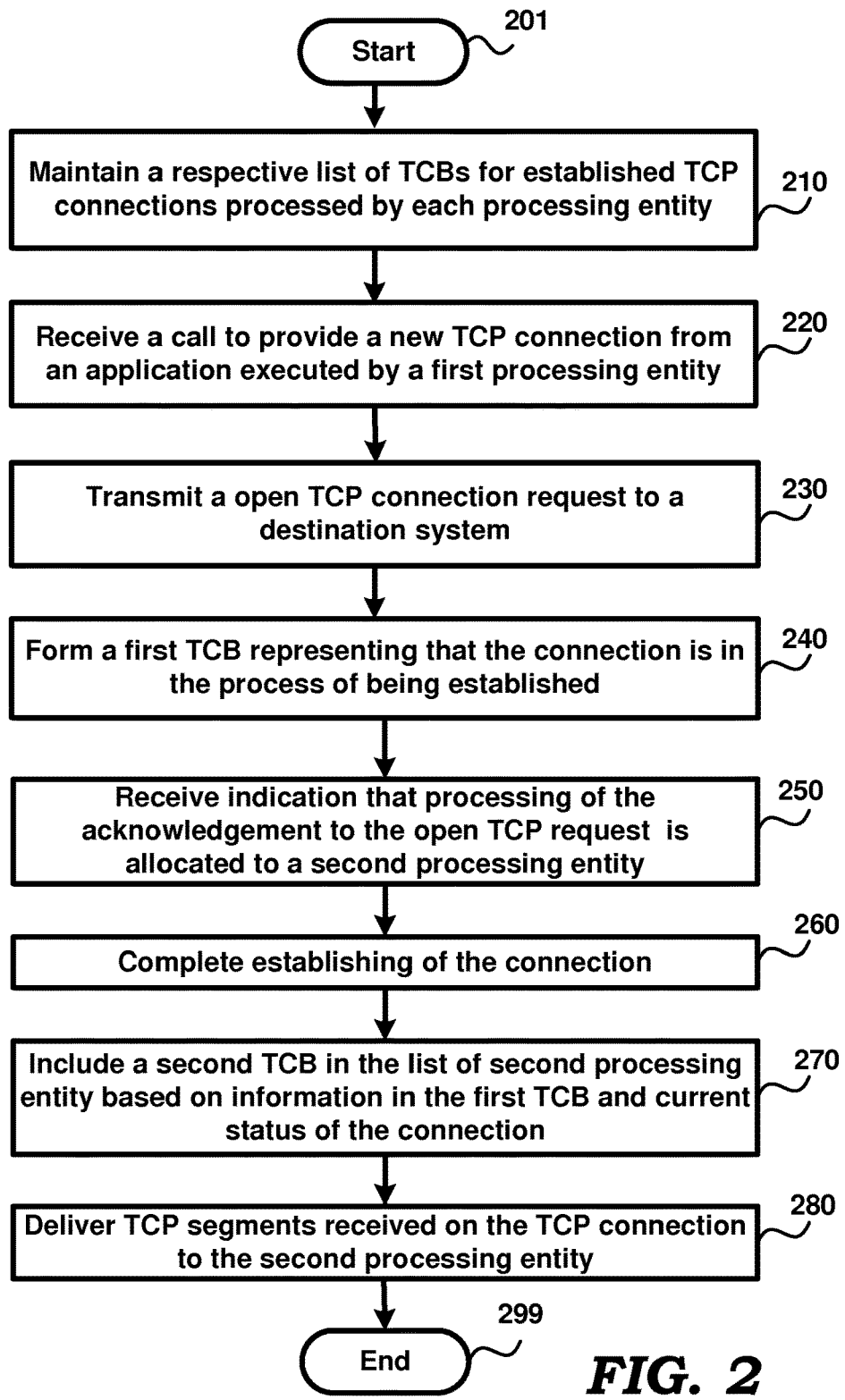
FIG. 2 is a flowchart illustrating the manner in which TCBs are managed in support of TCP connection requests, according to an aspect of the present disclosure.

FIG. 2 is a flow chart illustrating the manner in which TCBs are managed in support of TCP connection requests, according to an aspect of the present disclosure. The steps of the flowchart are described with respect to FIG. 1, in particular between source system 110A and destination system 120A, merely for illustration. However, the features can be implemented in other systems and environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, source system 110A maintains a corresponding list of TCBs for each processing entity within the system 110A. The TCBs in each list reflect the connections which have an end point at the applications executing in the corresponding processing entity.

In step 220, a call (request) is received from an application executing in a first processing entity, to open a new TCP connection. The call specifies the destination system 120A and a port number to which the connection is to be established. Control accordingly is transferred to step 230.

In step 230, the first processing entity transmits an open request (snd SYN) packet to the specified destination system. In addition, in step 240, a first TCB is formed indicating the status of the connection (SYN Sent), as well as the specific application that is the end point of the connection sought to be formed—that is, the application's TCP port number. In an embodiment, the end point is represented in the form of a socket, which internally contains a reference to the TCB. The port numbers and IP address of the destination are stored in the TCB itself.

As will be clear from the description below, the connection may be allocated to some other processing entity and accordingly the first TCB is not associated with the processing entity to which the requested connection is eventually allocated. Steps 230 and 240 are performed in response to receipt of the request of step 220.

In step 250, source system 110A receives an acknowledgement to the TCP connection request from destination system 120A. The acknowledgement is in the form of a packet that is received as a response to the open TCP connection request of step 230. According to the relevant packet format, a flag/bit is present, which is set to 1 (on) to indicate the acknowledgement. The packet may also have a SYN bit set to 1. The processing of the packet (and also additional packets received on the connection) is assumed to be assigned to a second processing entity, and a corresponding indication is generated within source system 110A.

In step 260, source system 110A completes establishment of the TCP connection by sending the appropriate packets. In case a SYN bit is set in the packet of step 250, an acknowledgement is sent to the SYN to complete establishment of the connection. In some scenarios, the packet of step 250 may not contain SYN bit (set to 1), in which case establishment of the connection is deemed to be half-open upon receipt of the acknowledgement of step 250. In such a case, the packets of step 280 (based on processing using the second TCB) are used to complete establishment of the packet.

In step 270, the second processing entity includes in the associated list, a second TCB representing the corresponding status information and end points. Some of the information (e.g., the end point in the destination system) of the first TCB may be included in the second TCB.

In an embodiment, source system 110A forms a second TCB and copies some of the information from the first TCB into the second TCB. Upon such copying, the information includes the identity of the end points of the connection, the state of the connection (as being in established state in case SYN was received in step 250 and as being in half-open state otherwise to start with), the buffer area where the data for the connection is stored as the data packets are received, the buffer area where the data for transmission over the connection is stored, as well as the specific (second) processing entity that is configured to process data packets received on the corresponding TCP connection. Steps 260 and 270 may be performed upon receipt of the packet of step 250.

In step 280, packets received on the established connection are processed in accordance with the information in the second TCB and thus delivered to the second processing entity. In case of half-open connections noted above, the packet exchange may be the basis to complete establishing the TCP connection (according to the requirements set forth in relevant RFC 793 noted below). Irrespective, the established connection is used for sending and receiving data using the second TCB. The exchanged data can be used by applications at either end according to the corresponding requirements. The method ends in step 299.

By allocating both the sending and receive tasks to a single processing entity, the implementation of source systems may be simplified as described below with examples. In the examples below, each processing entity is assumed to be a processor.

4. Hardware Implementation

Figure 3A:
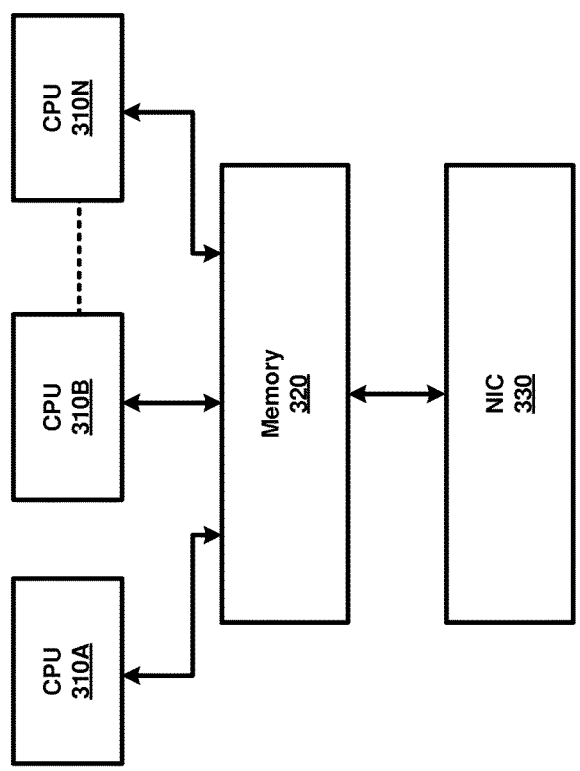
FIG. 3A is a block diagram illustrating the hardware details of a source system in an embodiment.
Figure 3B:
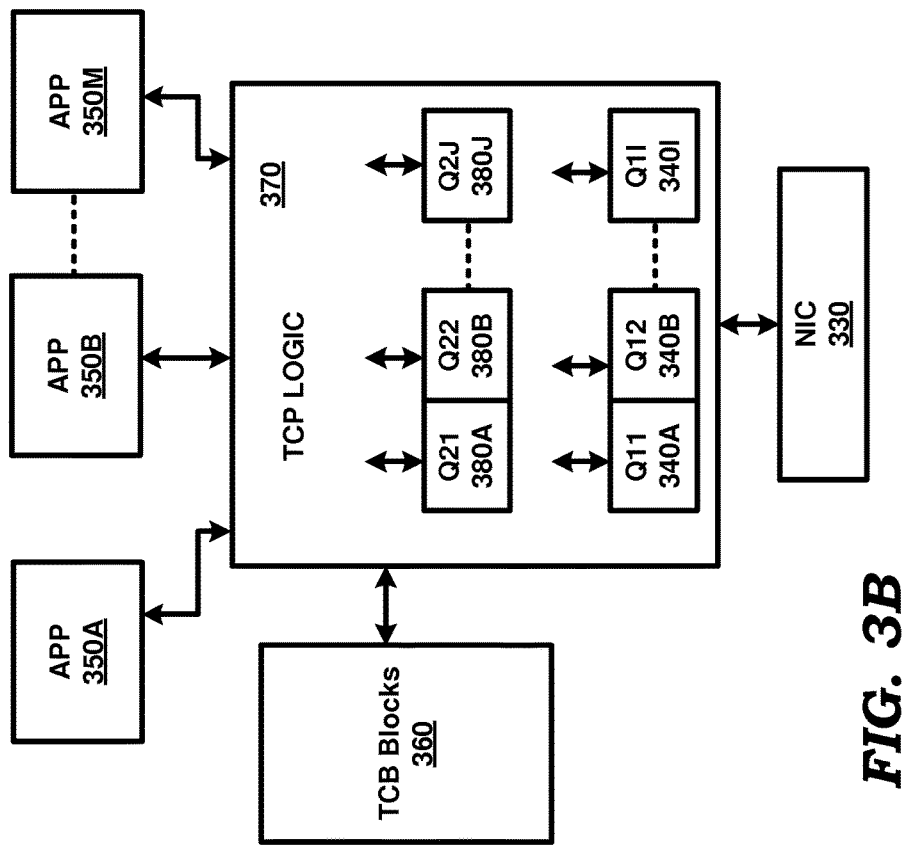
FIG. 3B is a block diagram illustrative the software view of a source system in an embodiment.

FIG. 3A is a block diagram illustrating the hardware details of source system 110A and FIG. 3B is a block diagram illustrative the software view of source system 110A, in an embodiment. Source system 110A is shown containing CPUs 310A-310N, memory 320, and NIC 330 in the hardware view and with applications 350A-350M, TCB blocks 360, NIC 330, socket queues Q21-Q2J (380A-380J), and classification queues Q11-Q1I (340A-340I) in the software view, with each block being supported by respective hardware and software blocks.

Each of CPUs 310A-310N represents a respective processing entity. In general, each processing entity is provided the processing and memory resources to execute in its own context, concurrently with other processing entities. Thus, a processing entity can be a hyper-threaded processor or one of multiple threads executing on a single (physical or hyper-threaded) processor.

The CPUs together operate as a multi-processing environment for each application 350A-350M executing in source system. In other words, a single application may be supported by concurrent/parallel execution on all (or several) of the CPUs based on code that is re-entrant (i.e., code that can be partially executed by one processing entity, and continued in the same or different processing entity and yet complete the original execution).

Many such applications (some of which may correspond to instances of the same application) 350A-350M may be supported by the CPUs (processing entities, in general) together. In an embodiment, each application is implemented with socket interface (with each socket being uniquely associated with a corresponding TCB) to send and receive data sequences. Each application may send and receive data via the corresponding one of socket queues 380A-380J. When a data segment is available in a corresponding socket queue, the corresponding application instance receives (according to the migrated TCB) and processes the data.

For example, an application instance may initiate a TCP connection request and block on the corresponding socket, while the connection is being established. The application instance is then woken up (by appropriate corresponding signaling) from the blocked state and rescheduled on the CPE where the connection was mapped to. Alternatively, an application may be designed to poll for completion event after initiating opening of connection. In such a case, the completion event is delivered to the application instance (by appropriate corresponding signaling) and the application instance can execute the necessary logic following reception of the event. In either case the application instance is executed by the second processor (corresponding to the migrated TCB) due to the re-entrant feature of the applications.

Memory 320 provides the storage space for various queues Q11-Q1I, Q21-Q2J and TCB blocks 360 noted above. Each socket queue (Q21-Q2J) and the corresponding TCBs may be accessible only by the corresponding processing entity. Memory 320 may also provide storage for instructions (including to support reentrant feature) which are executed by various CPUs to implement the applications, TCP logic, etc. Portion of memory 320 (e.g., classification queues Q11-Q1I) may be implemented within NIC 330.

Each of socket queues Q21-Q2J buffers the data stream corresponding to respective one of the connections in both inbound and outbound direction. Thus, the data packets (TCP segments) corresponding to inbound data (including the destination port number, etc.) may be maintained as one linked list and the data packets corresponding to outbound data may be maintained as another linked list. It may be appreciated that each application may have a number of associated socket queues equaling the number of connections terminating at that application.

TCB blocks 360 contains a TCB block for each connection. As noted above, each established connection is allocated to one of the CPUs, and the corresponding set of TCB blocks are stored associated with each CPU. In addition, TCB blocks are maintained for each connection, which is in the process of being established as well. Once established, each socket queue is uniquely bound to a corresponding TCB block. Thus, each socket queue and TCB block combination is uniquely bound to a single application as well as a single processor (processing entity) executing that single application for the purpose of processing the packets received on the corresponding TCP connection.

TCP logic 370 maintains TCB blocks 360, implying that each TCB block is created, modified (with state information) and removed, according to TCP protocol, as described above. TCP logic 370 interfaces with the remote applications to ensure the 'sequence' of data bytes is appropriately received, before delivering the sequence to the corresponding application (as indicated by the respective TCB). Though TCP logic 370 is shown as a single block for all the processing blocks together, the corresponding software instructions may also be re-entrant and executed by multiple parallel threads for each processing entity.

NIC 330 places each incoming data packet in one of classification queues Q11-Q1I, for example, by hashing the portions invariant for each established connection to a unique identifier corresponding to the queue. NIC 330 uses a classification algorithm to pick one of the classification queues to place a received TCP segment. The classification algorithm uses, for example, Source MAC, Destination MAC, Source IP, Destination IP, Source TCP Port, and Destination TCP Port, to pick a queue. NIC 330 may be implemented as a VNIC supporting multiple MAC/IP addresses, as suited in the corresponding environments.

TCP logic 370 identifies an applicable one of the TCB from TCB blocks 360 by comparing the IP addresses and port numbers in each IP packet of the classification queues, with those in the respective TCB. TCP logic 370 places the segment in the socket queue (Q21-Q2J) corresponding to the identified TCB. After placing each packet in a determined socket queue (Q21-Q2J), TCP logic 370 provides appropriate signals to the corresponding application (executing in the processing entity to which the TCB block is associated with) to indicate completion of establishment of the requested connection, and thereafter availability of data for processing by the application. Though shown as a single block, TCP logic 370 may be executed by each processor with private view of the corresponding TCBs, buffers, etc.

However, in case of an IP packet (connection being established) having an acknowledgement, NIC 330 may allocate the packet to one of the CPUs that is most suitable to process the subsequent data packets on the connection, including half-open connection. For example, load may be balanced among the various CPUs using, for example, the receive side scaling (RSS) approach well known in the relevant arts. TCB blocks 360 may accordingly be updated by TCP logic 370 (of the allocated processing entity), consistent with the allocation, as described below.

5. Management of TCBs

FIGS. 4A-6 depict the status of TCB blocks in a source system, during various successive time instances in processing a request for a transmission control protocol (TCP) connection. The various changes there are performed by TCP logic 370, though not expressly mentioned.

Figure 4A:
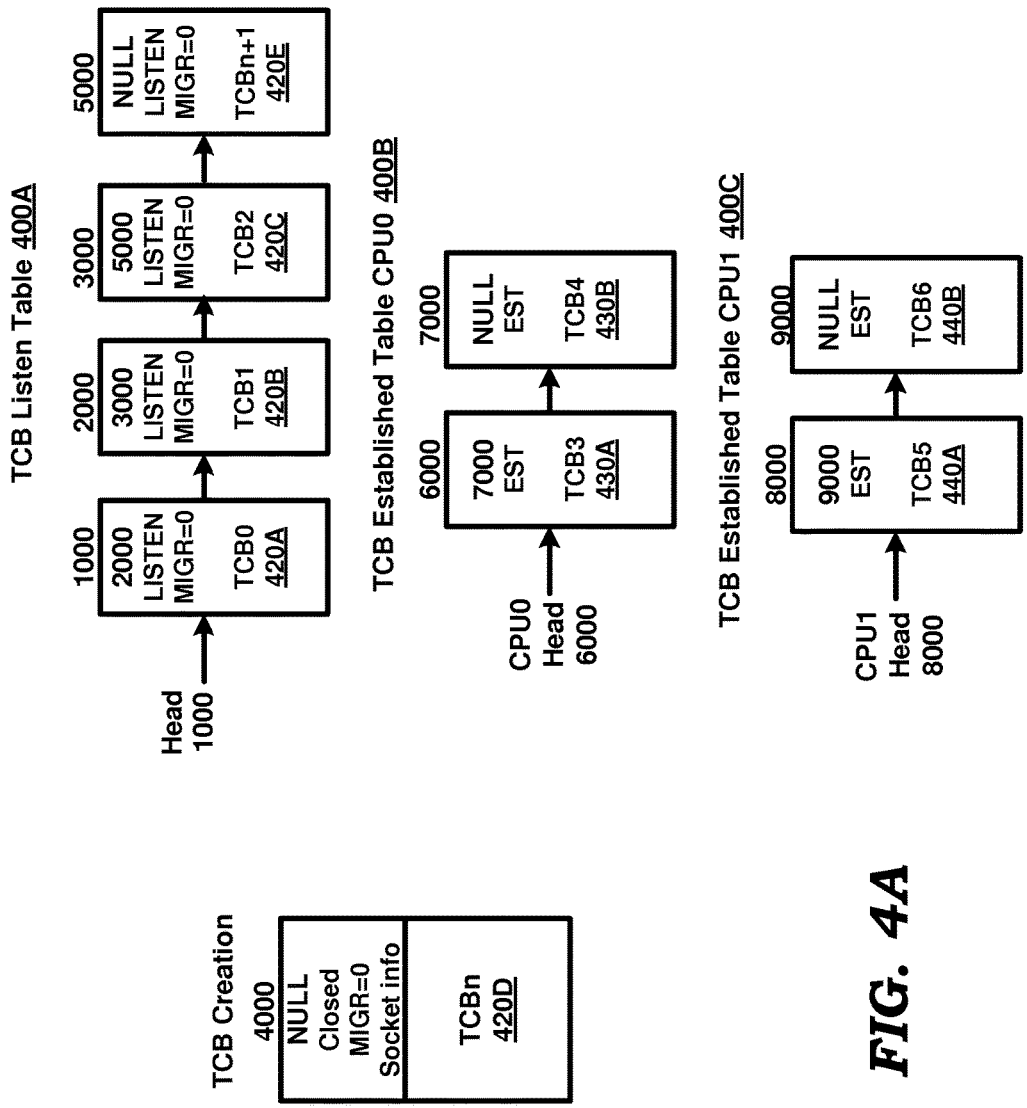
FIG. 4A depicts the status of TCB blocks in a source system at a time instant in an embodiment.

FIG. 4A depicts the various TCB blocks at a first time instance, before a request for a TCP connection is made by an application in the source system (step 220). TCB Listen Table 400A is shown containing a linked list of TCBs that are common to all the processing entities in the source system. Each TCB in listen table 400A contains information for a TCP connection, which is in the process of being established.

TCB Established Tables 400B and 400C are shown to be associated with the first and second processing entities respectively (CPU0 and CPU1). Each established table 400B and 400C contains linked list of TCBs corresponding to the first and second processing entities respectively. While the list of TCBs is shown as a linked list, it will be readily appreciated that the list of TCBs may be maintained by TCP logic 370 using other data structures, including as a per-CPU hash table, a single hash table with per-CPU collision list, or any other type of per-CPU data structure, as suited in the corresponding environments, without departing from the scope of and spirit of several aspects of the present disclosure.

Each TCB is shown with information such as their location in the memory (1000, 2000, etc.,), a pointer to the next TCB (2000, 3000, etc.,), and a TCP state field (CLOSED, LISTEN, SYN_SENT, EST). Thus, the TCBs in listen table 400A are shown in LISTEN state (in the process of being established), while the TCBs in established tables 400B and 400C are shown in EST state (established).

TCB template 420D, shown at memory location 4000, is a general template available in memory 320 to simplify creation of each TCB. TCB template 420D is later used within TCB Listen Table 400A when a request for a TCP connection is received from an application in the source system, as will be described below. At the time of creation, the next TCB pointer field is NULL (since the TCB doesn't point to any other TCB at this first instance), the TCP state field is CLOSED (reflecting no TCP connection activity), the migrated flag field is 0 ("False", showing that the TCB has not migrated to an Established Table associated with one of the processing entities) and the socket information (destination port, source port and source IP address) is empty (reflecting no TCP connection activity).

Figure 4B:
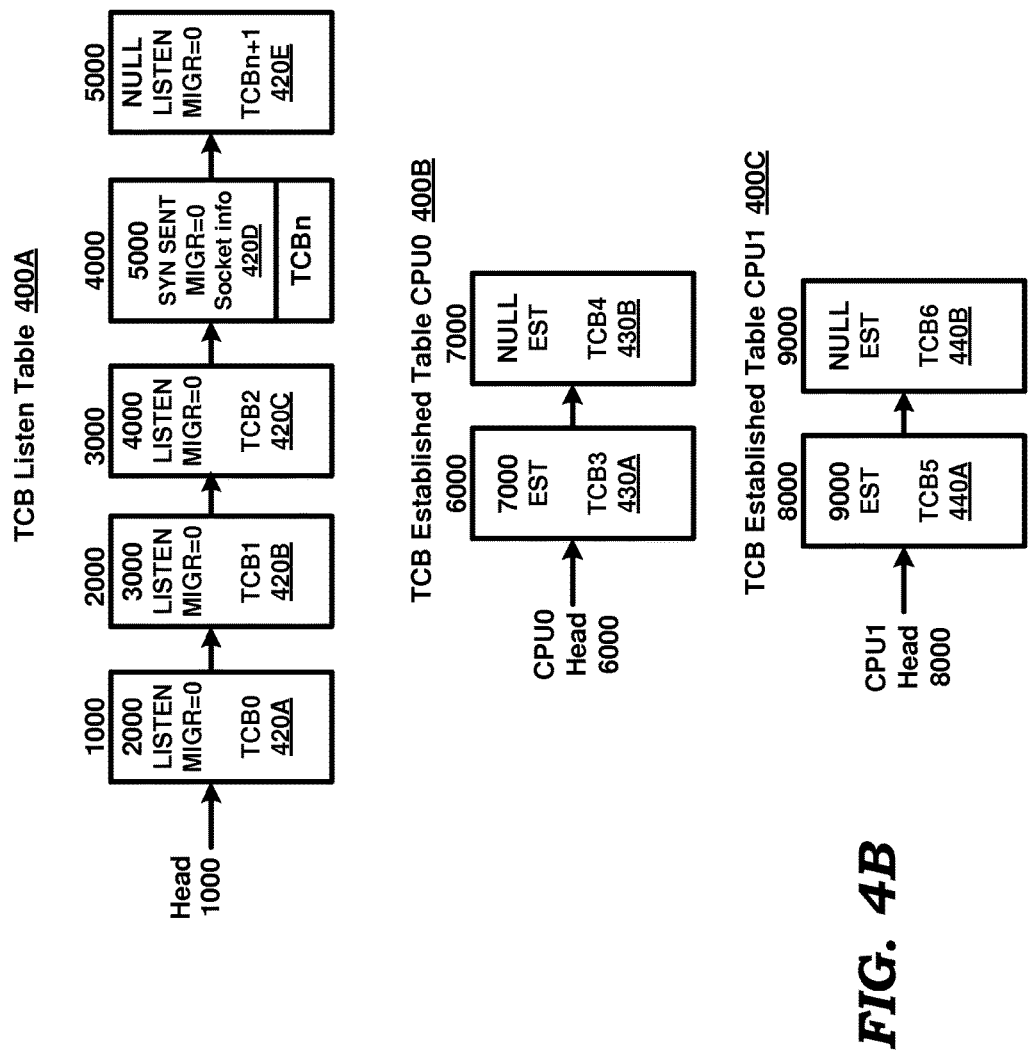
FIG. 4B depicts the status of TCB blocks upon sending of a request for a new TCP connection in an embodiment.

FIG. 4B shows the state of the TCB blocks at a second time instance, after a request for a TCP connection is made by an application (executed, for example, by CPU0) in the source system (steps 230/240). Once the TCP connection request is made, TCB 420D is placed into the linked list of the Listen Table 400A by manipulating the TCB's data structure. Further, the TCP connection request is sent to the destination system (SYN), and the State field in TCB 420D is updated to "SYN_SENT". The migration field is shown maintained at 0. During the insertion of TCB 420D, TCB listen table 400A may be locked since the table is accessible by all the processing entities. As may be observed from FIG. 4B, TCB listen table 400A is shown shared for sharing of TCBs 420A-420C of passive TCP connections and TCB 420D of active TCP connection.

Figure 5:
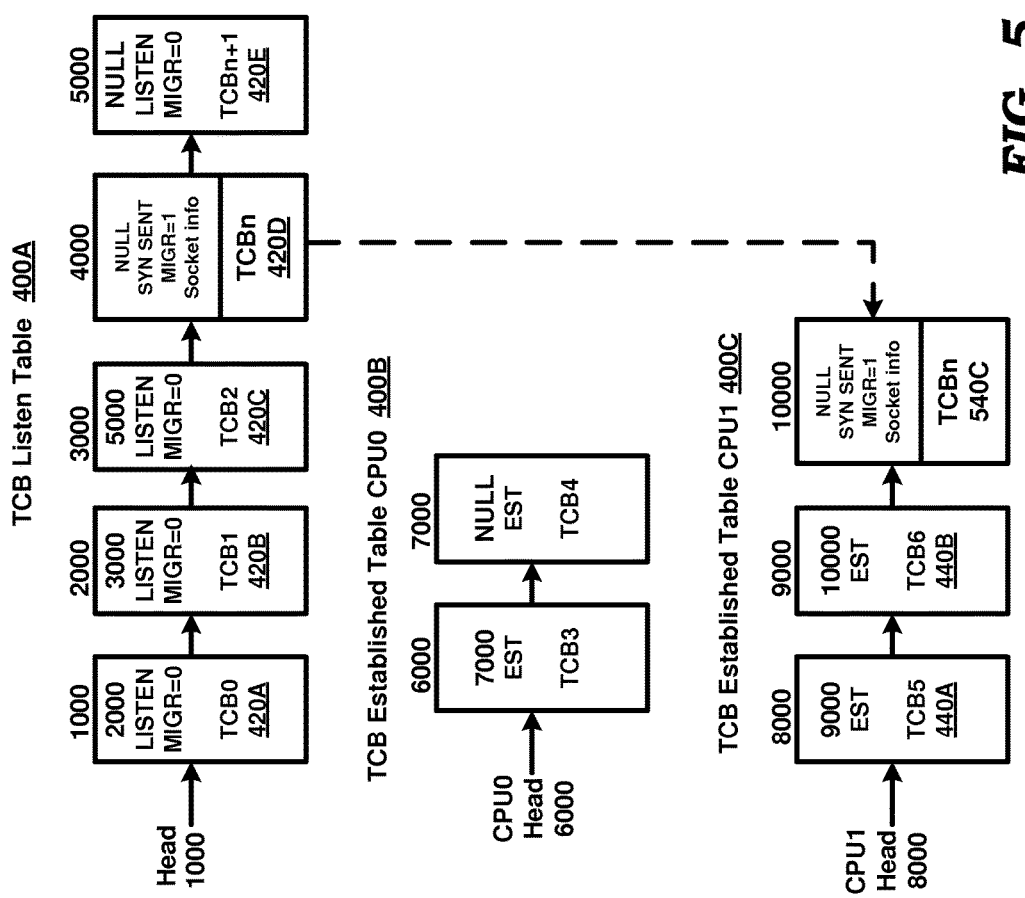
FIG. 5 depicts the status of TCB blocks as a TCB block is migrated from a common data structure to a data structure specifically corresponding to a processing entity to which the connection is allocated in an embodiment.

FIG. 5 depicts the operation upon receipt of the acknowledgment to the open request (step 250). It is assumed that the processing of the packets of not-yet-established connection (including the SYN ACK) is assigned to CPU1 (processor 310B) by NIC 330, thereby requiring the migration of TCB 420D to the linked list of CPU1 400C. As shown by the broken arrow, portion of the socket information (e.g., the source port number, the destination IP address, etc.) is copied into a newly formed TCB 540C from TCB 420D.

At least some of the pieces of information copied and eventually present in TCB 540C are described in RFC 793, entitled, "Transmission Control Protocol", dated September 1981. As a part of the migration, the MIGR field is shown set to 1 (the other TCBs in established tables also have the same value, though not shown). In addition, the status of TCB 540C is maintained as 'SYN SENT' at the time of copying. TCBs in TCB Listen Table 400A with MIGR set to 1 are not used in future lookups of Listen Table 400A.

Figure 6:
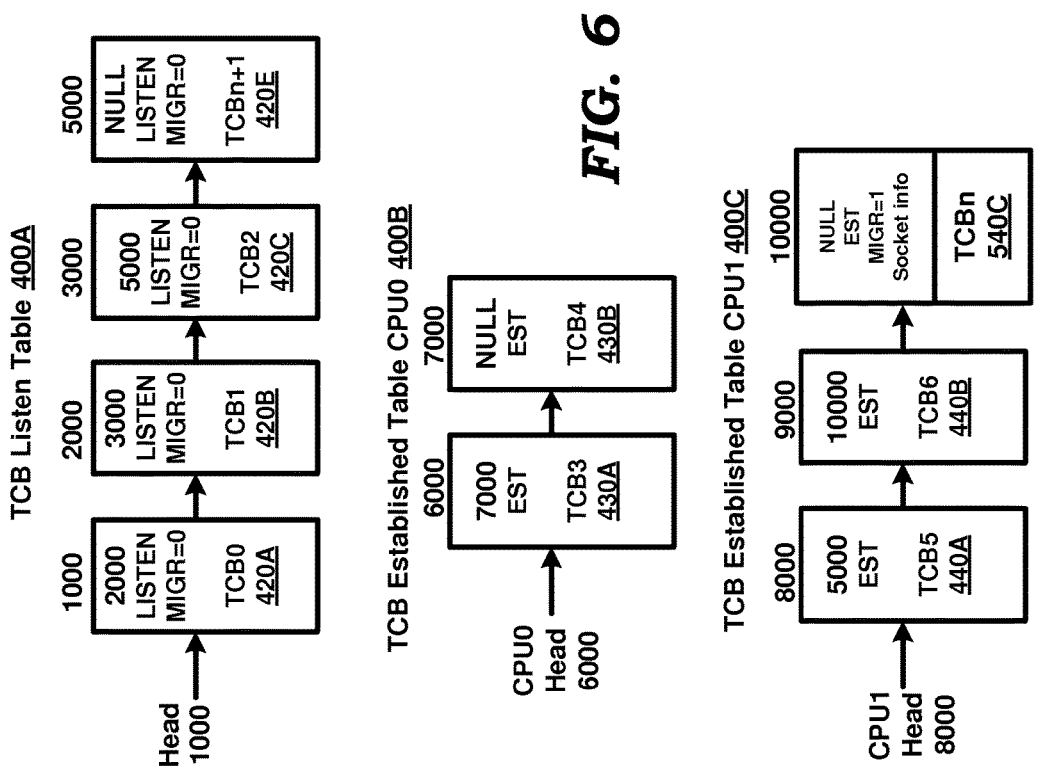
FIG. 6 depict the status of TCB blocks in a source system after completion of establishing of the new TCP connection in an embodiment.

FIG. 6 depicts the status of the various tables after completion of establishment of the requested connection. Upon sending of an acknowledgement (to the SYN received in step 250) by TCP logic 370, the status on TCB 540C is shown as 'EST', confirming that the establishment of the TCP connection is complete.

As may also be readily observed, TCB 420D is shown deleted (garbage collection). Such deletion may be performed while applying appropriate lock on table 400A. Thus, as the TCB is deemed to have been successfully migrated, TCP logic 370 may thereafter process both inbound and outbound IP packets consistent with such tables.

It may be observed that no lock needs to be established on tables 400B and 400C during migration of TCB blocks from listen table 400A. The throughput performance of source system 110A is enhanced as a result.

It should be further appreciated that the features described above can be implemented in various embodiments as a desired combination of one or more of hardware, executable modules, and firmware. The description is continued with respect to an embodiment in which various features are operative when executable modules are executed.

6. Digital Processing System

Figure 7:
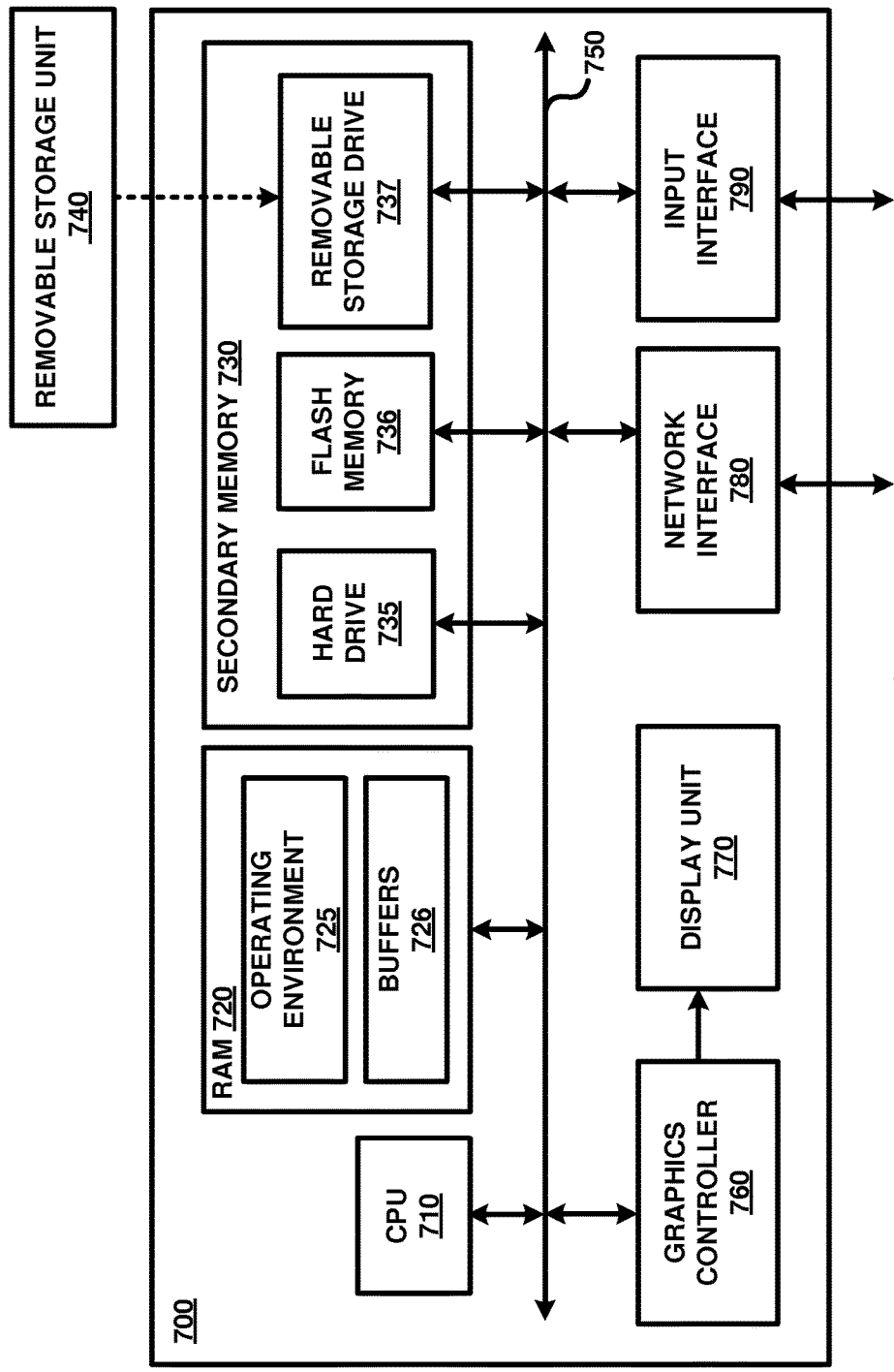
FIG. 7 is a block diagram illustrating the details of a digital processing system in which several aspects of the present invention are operative by execution of appropriate software instructions.

FIG. 7 is a block diagram illustrating the details of digital processing system 700 in which various aspects of the present disclosure are operative by execution of appropriate software instructions. Digital processing system 700 may correspond to source system 110A.

Digital processing system 700 may contain one or more processors as a part of central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units (processors), with each processing unit potentially being designed for a specific task. Alternatively, CPU 710 may contain only a single general-purpose processing unit supporting multiple processing entities.

RAM 720 may receive instructions from secondary memory 730 using communication path 750. RAM 720 is shown currently containing software instructions constituting shared environment 725 and buffers 726 (for storing the TCBs, packet buffering, etc.). Shared environment 725 includes operating systems, device drivers, virtual machines, etc., which provide a (common) run time environment for execution of various software blocks.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 (NIC 330) provides connectivity to a network (e.g., using Internet Protocol), and may be used to communicate with other systems (such as those shown in FIG. 1) connected to the network.

Secondary memory 730 may contain hard drive 735, flash memory 736, and removable storage drive 737. Secondary memory 730 may store the data and software instructions (e.g., for performing the actions noted above with respect to FIG. 2), which enable digital processing system 700 to provide several features in accordance with the present disclosure.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EEPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of supporting transmission control protocol (TCP) connections in a source system enabled to communicate over an IP (Internet Protocol) network, said method comprising:

maintaining a corresponding list of transmission control blocks (TCBs) for each processing entity of a plurality of processing entities executing an application as multi-processing environment;

receiving a call from said application to provide a new TCP connection to a destination system, said call being received while said application is being executed by a first processing entity of said plurality of processing entities, wherein said plurality of processing entities are implemented by one or more processing units provided in said source system;

transmitting by said first processing entity, in response to said call, an open TCP connection request to said destination system on said IP network at a first time instance;

forming a first TCB representing that said new TCP connection is in the process of being established, in response to receiving said call;

receiving, at a second time instance, an indication that processing of data stream of said new TCP connection is allocated to a second processing entity, wherein said second time instance is after said first time instance;

completing establishing of said new TCP connection;

including a second TCB in a list of TCBs associated with said second processing entity in response to said indication, wherein said second TCB indicates that said TCP connection is established to said destination system for said application, wherein said including is performed associated with establishing of said new TCP connection in response to said call to provide said new TCP connection;

receiving TCP segments on said new TCP connection upon completion of establishing of said new TCP connection; and delivering said TCP segments received on said new TCP connection to said second processing entity in view of said second TCB being associated with said second processing entity, wherein said application is an end point in said source system for said new TCP connection, wherein said application executed by said second processing entity receives and processes said TCP segments.

2. The method of claim 1, wherein said first TCB indicates that said application is said end point of said new TCP connection and that said new TCP connection is in the process of being established, wherein said including comprises copying from said first TCB to said second TCB, data indicating that said new TCP connection has said end point at said application.

3. The method of claim 2, further comprising receiving a packet on said IP network in response to said transmitting of said open TCP connection request, wherein said packet contains an acknowledgement flag set by said destination system acknowledging receipt of said open TCP connection request, wherein a network interface card (NIC) of said source system allocates processing of said packet to said second processing entity, wherein said indication is generated upon said NIC allocating processing of said packet to said second processing entity, wherein said data stream comprises a sequence of packets received after said second time instance.

4. The method of claim 3, wherein said packet further comprises a SYN flag set by said destination system, said completing further comprises sending, by said second processing entity, another packet to said destination system, with said acknowledgement flag being set to acknowledge receipt of said SYN flag.

5. The method of claim 1, wherein each of said list of TCBs is maintained as a corresponding data structure of TCBs accessible only by corresponding processing entity such that a first data structure of TCBs is accessible only by said first processing entity and a second data structure of TCBs is accessible only by said second processing entity, wherein said first TCB is maintained in a common data structure which contains respective TCBs for connections in the process of being established by any of said plurality of processing entities, wherein said common data structure is locked prior to insertion and deletion of said first TCB, wherein said first TCB is deleted after said including.

6. The method of claim 5, wherein said one or more processing units comprises one or more processors in said source system, wherein said first processing entity is a first processor of said one or more processors and said second processing entity is a second processor of said one or more processors, wherein each of said data structure is a corresponding linked list.

7. The method of claim 6, wherein said application and TCP logic is executed by all of said plurality of processing entities, including said first processor and said second processor.

8. A non-transitory machine readable medium storing one or more sequences of instructions for enabling a source system to support transmission control protocol (TCP) connections over an IP (Internet Protocol) network, wherein execution of said one or more instructions by one or more processors contained in said source system enables said source system to perform the actions of:

maintaining a corresponding list of transmission control blocks (TCBs) for each processing entity of a plurality of processing entities executing an application as multi-processing environment;

receiving a call from said application to provide a new TCP connection to a destination system, said call being received while said application is being executed by a first processing entity of said plurality of processing entities, wherein said plurality of processing entities are implemented by one or more processing units provided in said source system;

transmitting by said first processing entity, in response to said call, an open TCP connection request to said destination system on said IP network at a first time instance;

forming a first TCB representing that said new TCP connection is in the process of being established, in response to receiving said call;

receiving, at a second time instance, an indication that processing of data stream of said new TCP connection is allocated to a second processing entity, wherein said second time instance is after said first time instance;

completing establishing of said new TCP connection;

including a second TCB in a list of TCBs associated with said second processing entity in response to said indication, wherein said second TCB indicates that said TCP connection is established to said destination system for said application, wherein said including is performed associated with establishing of said new TCP connection in response to said call to provide said new TCP connection; and receiving TCP segments on said new TCP connection upon completion of establishing of said new TCP connection;

delivering said TCP segments received on said new TCP connection to said second processing entity in view of said second TCB being associated with said second processing entity, wherein said application is an end point in said source system for said new TCP connection, wherein said application executed by said second processing entity receives and processes said TCP segments.

9. The non-transitory machine readable medium of claim 8, wherein said first TCB indicates that said application is said end point of said new TCP connection and that said new TCP connection is in the process of being established, wherein said including comprises copying from said first TCB to said second TCB, data indicating that said new TCP connection has said end point at said application.

10. The non-transitory machine readable medium of claim 9, further comprising receiving a packet on said IP network in response to said transmitting of said open TCP connection request, wherein said packet contains an acknowledgement flag set by said destination system acknowledging receipt of said open TCP connection request, wherein a network interface card (NIC) of said source system allocates processing of said packet to said second processing entity, wherein said indication is generated upon said NIC allocating processing of said packet to said second processing entity, wherein said data stream comprises a sequence of packets received after said second time instance.

11. The non-transitory machine readable medium of claim 10, wherein said packet further comprises a SYN flag set by said destination system, said completing further comprises sending, by said second processing entity, another packet to said destination system, with said acknowledgement flag being set to acknowledge receipt of said SYN flag.

12. The non-transitory machine readable medium of claim 8, wherein each of said list of TCBs is maintained as a corresponding data structure of TCBs accessible only by corresponding processing entity such that a first data structure of TCBs is accessible only by said first processing entity and a second data structure of TCBs is accessible only by said second processing entity, wherein said first TCB is maintained in a common data structure which contains respective TCBs for connections in the process of being established by any of said plurality of processing entities, wherein said common data structure is locked prior to insertion and deletion of said first TCB, wherein said first TCB is deleted after said including.

13. The non-transitory machine readable medium of claim 12, wherein said one or more processing units comprises one or more processors in said source system, wherein said first processing entity is a first processor of said one or more processors and said second processing entity is a second processor of said one or more processors, wherein each of said data structure is a corresponding linked list.

14. The non-transitory machine readable medium of claim 13, wherein said application and TCP logic is executed by all of said plurality of processing entities, including said first processor and said second processor.

15. A digital processing system comprising:
one or more processing units; and
a random access memory (RAM) to store instructions, wherein said one or more processing units retrieve said instructions and execute said instructions, wherein execution of said instructions causes said digital processing system to perform the actions of:

maintaining a corresponding list of transmission control blocks (TCBs) for each processing entity of a plurality of processing entities executing an application as multi-processing environment;

receiving a call from said application to provide a new TCP connection to a destination system, said call being received while said application is being executed by a first processing entity of said plurality of processing entities, wherein said plurality of processing entities are implemented by one or more processing units provided in said source system;

transmitting by said first processing entity, in response to said call, an open TCP connection request to said destination system over an IP (Internet Protocol) network at a first time instance;

forming a first TCB representing that said new TCP connection is in the process of being established, in response to receiving said call;

receiving, at a second time instance, an indication that processing of data stream of said new TCP connection is allocated to a second processing entity, wherein said second time instance is after said first time instance;

completing establishing of said new TCP connection;

including a second TCB in a list of TCBs associated with said second processing entity in response to said indication, wherein said second TCB indicates that said TCP connection is established to said destination system for said application, wherein said including is performed associated with establishing of said new TCP connection in response to said call to provide said new TCP connection;

receiving TCP segments on said new TCP connection upon completion of establishing of said new TCP connection; and delivering said TCP segments received on said new TCP connection to said second processing entity in view of said second TCB being associated with said second processing entity, wherein said application is an end point in said source system for said new TCP connection, wherein said application executed by said second processing entity receives and processes said TCP segments.

16. The digital processing system of claim 15, wherein said first TCB indicates that said application is said end point of said new TCP connection and that said new TCP connection is in the process of being established, wherein said including comprises copying from said first TCB to said second TCB, data indicating that said new TCP connection has said end point at said application.

17. The digital processing system of claim 16, further comprising receiving a packet on said IP network in response to said transmitting of said open TCP connection request, wherein said packet contains an acknowledgement flag set by said destination system acknowledging receipt of said open TCP connection request, wherein a network interface card (NIC) of said source system allocates processing of said packet to said second processing entity, wherein said indication is generated upon said NIC allocating processing of said packet to said second processing entity, wherein said data stream comprises a sequence of packets received after said second time instance.

18. The digital processing system of claim 17, wherein said packet further comprises a SYN flag set by said destination system, said completing further comprises sending, by said second processing entity, another packet to said destination system, with said acknowledgement flag being set to acknowledge receipt of said SYN flag.

19. The digital processing system of claim 15, wherein each of said list of TCBs is maintained as a corresponding data structure of TCBs accessible only by corresponding processing entity such that a first data structure of TCBs is accessible only by said first processing entity and a second data structure of TCBs is accessible only by said second processing entity,
   wherein said first TCB is maintained in a common data structure which contains respective TCBs for connections in the process of being established by any of said plurality of processing entities,
   wherein said common data structure is locked prior to insertion and deletion of said first TCB, wherein said first TCB is deleted after said including.

20. The digital processing system of claim 19, wherein said one or more processing units comprises one or more processors in said source system, wherein said first processing entity is a first processor of said one or more processors and said second processing entity is a second processor of said one or more processors, wherein each of said data structure is a corresponding linked list.

* * * * *